Feb. 23, 1932.  E. BREITLING  1,846,785
DRIVING GEAR FOR CASH REGISTERS AND CALCULATING MACHINES
Filed July 8, 1929
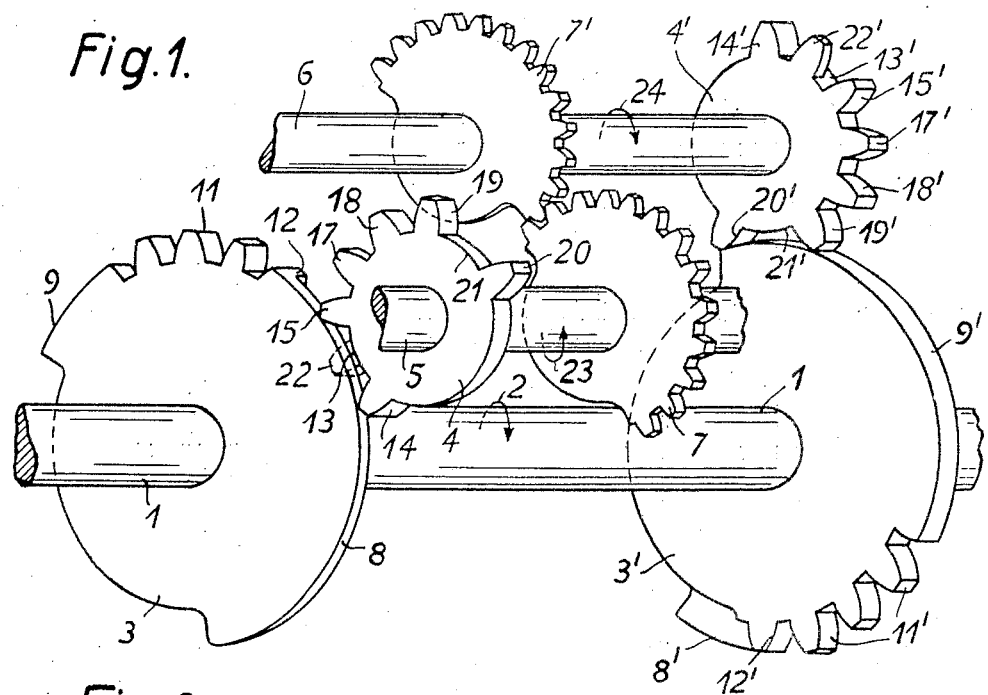
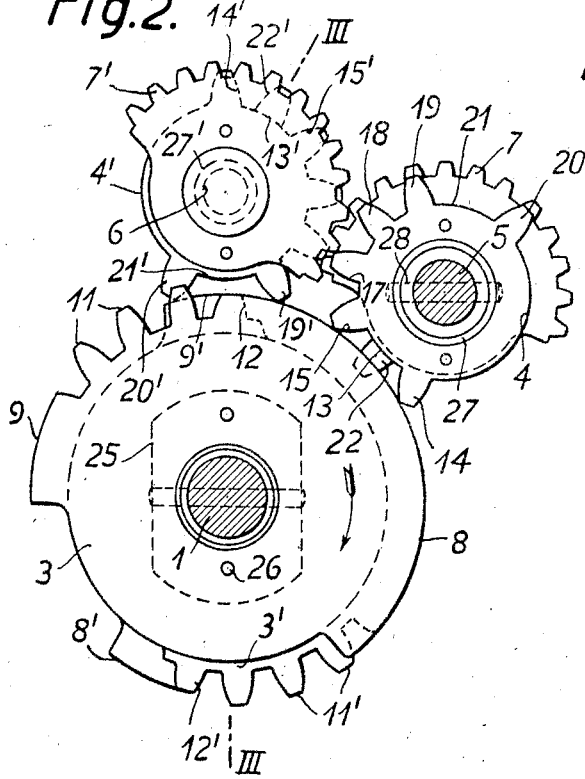
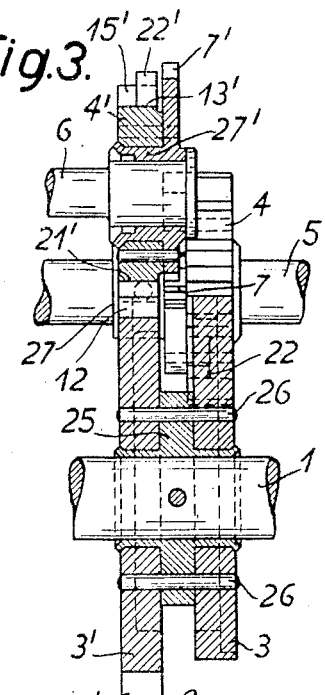

Patented Feb. 23, 1932

1,846,785

UNITED STATES PATENT OFFICE

ERNST BREITLING, OF ESSEN, GERMANY, ASSIGNOR TO FRIED. KRUPP AKTIENGESELL-
SCHAFT, OF ESSEN-ON-THE-RUHR, GERMANY

DRIVING GEAR FOR CASH REGISTERS AND CALCULATING MACHINES

Application filed July 8, 1929, Serial No. 376,745, and in Germany August 2, 1928.

This invention relates to driving gears for cash registers and calculating machines in which a rotary motion is converted into a rocking one. In place of the thrust cam gear usual in gears of this class arranged between the driving shaft and the driven rocking shaft the invention provides that the driving shaft by means of an actuating member successively introduces in each of two actuating segments interconnected so as to execute oppositely directed motions, a stepwise motion, one of these segments being fixed on the driven rocking shaft. When compared with the above known arrangement including a thrust cam gear the new arrangement requires less space and affords a greater reliability in operation.

In order that the invention can be more readily understood, a preferred embodiment of the same is illustrated by way of example in the accompanying drawings in which Figure 1 is a perspective view of the new driving gear, Figure 2 is a front view thereof, and Figure 3 is a section on line III—III of Figure 2.

Referring to these figures, 1 denotes the driving shaft, Figure 1, which in each operation of the machine executes a full revolution in the direction of arrow 2. On shaft 1 is fixed an actuating member that consists of two actuating disks 3, 3'. Each of these disks which for the sake of clearness are shown spaced from one another in Figure 1, co-operates with a rocking segment 4, 4' respectively segment 4 being fixed on the rocking shaft 5 to be driven, while segment 4' is loosely mounted on an auxiliary shaft 6.

Segment 4 has rigidly connected to it a toothed segment 7 which is permanently in mesh with a toothed segment 7' rigidly connected to segment 4'. The two rocking segments 4, 4' thus are enforced to execute rocking motions in opposite direction relatively to one another.

The actuating disk 3 possesses two locking surfaces 8 and 9 which are separated from one another by a series of teeth 11 comprising three teeth and four gaps. As to be clearly seen from Figure 1, the locking surface 8 is so set off beside the teeth 11 that a tooth 12 remains which has a height less than that of the teeth 11, see Figure 2. The segment 4 which as mentioned co-operates with actuating disk 3 possesses a gap 13 situated between two teeth 14, 15 and co-operating with the locking surface 8. Tooth 15 is followed by three teeth 17, 18, 19, another gap 21, and a tooth 20. This gap 21 co-operates with the locking surface 9. Gap 13 extends only up to half the thickness of segment 4 so that a tooth 22 of half width remains. This half tooth co-operates with tooth 12 of actuating disk 3. Upon the latter turning, tooth 12 strikes tooth 22 and starts the mesh of the teeth 11 with the teeth 15 to 19. Tooth 12 thus is a mesh-starting lug.

In a corresponding manner the actuating disc 3' is fitted with an offset locking surface 8' having a stub tooth 12', with a series of teeth 11', and a full locking surface 9'. The appurtenant rocking segment 4' has a gap 21', another gap 13' of half thickness, and therebetween four teeth 15', 17', 18', 19'. It further possesses beside gap 13' a tooth 22' of half thickness which co-operates with the mesh-starting tooth 12'.

When in position of rest, the described gear assumes the position illustrated in Figure 1. The locking surface 8 engages gap 13 and holds the half tooth 22 in a radial direction relatively to shaft 1. The locking surface 9' engages gap 21'. The two rocking segments 4, 4' thus are locked twice in the position of rest of the gear.

When driving shaft 1 is turned in the direction of arrow 2, Figure 1, tooth 12 strikes tooth 22 and effects mesh of tooth 15 with teeth 11 the instant the end of locking surface 9' leaves tooth 19'. Up to this instant the two rocking segments 4, 4' have been locked in the one direction of rotation by tooth 14 and locking surface 8 and in the other direction by tooth 19' and locking surface 9. Upon rotation of shaft 1 continuing, the rocking shaft 5 is turned in the direction of arrow 23, Figure 1, owing to the co-operation of the teeth 11 with the teeth 15, 17, 18, 19 of segment 4, until gap 21 comes into mesh with locking surface 9.

By this rotation of rocking shaft 5 rotation is imparted also to segment 4' through the teeth 7, 7', this rotation taking place in the direction of arrow 24, Figure 1, whereby gap 13' arrives in operative position and is entered by locking surface 8'. The rocking segments 4, 4' are then locked again in every direction of rotation and persevere in locked condition even when the gap that follows tooth 12', of the series of teeth 11, arrives opposite tooth 15', because locking surface 9 is of a length such as to give free tooth 19 only the instant the tooth 12' strikes the half tooth 22' which in this section of time assumes radial position relatively to shaft 1. When this takes place, the teeth 11' engage the teeth 15', 17', 18', 19' whereby both segment 4' and segment 4 together with shaft 5 is turned back to initial position in the direction of arrows 24 and 23, respectively. At the end of the revolution of driving shaft 1 gap 13 is again in mesh with locking surface 8 and gap 21' with locking surface 9' so that the gear again assumes the position illustrated in Figure 1.

The amplitude of the rocking motion which in the embodiment described is 180 degrees depends upon the length of the series of teeth 11, 11' and upon the gear ratio existing between them and the rocking segments 4, 4', and thus can be varied within certain limits by altering these values. Furthermore, the distribution of the to and fro rocking motion of the segments 4, 4' on the time of revolution of shaft 1 is not subjected to any determined law but depends merely upon the arrangement and length of the locking surfaces and of the series of teeth 11, 11'.

The practical design of the described gear is illustrated in Figures 2 and 3. The two actuating disks 3, 3' are so riveted by pins 26 onto a common hub 25 fast on shaft 1 that they include a free space within which the toothed segment 7, 7' can freely rock. Onto the hubs 27, 27' of the latter are riveted the segments 4, 4'. Hub 27 is rigidly connected to shaft 5 by a pin 28 whilst hub 27' is loosely mounted on shaft 6 which forms a semi-fixed beam.

What I claim and desire to secure by Letters Patent, is:—

1. In a driving gear for cash registers and the like, a drive shaft, actuating members driven in one direction by said drive shaft, two rocking members, connections between said rocking members and said actuating members, said actuating members firstly rocking one of said rocking members and subsequently rocking the other of said rocking members, a driven shaft, connections between each of said rocking members and said driven shaft whereby each of said rocking motions is imparted to said driven shaft.

2. In a driving gear for cash registers and the like, a drive shaft, an actuating member driven by said drive shaft, two rocking members, interconnections between said actuating member and said rocking members, said actuating member thereby imparting a successive stepwise motion to each of said rocking members, an interconnection between said rocking members for causing said rocking members to execute opposite rocking motions, and a driven rocking shaft, one only of said rocking members being fixed to said shaft.

3. A gear according to claim 2 provided with tooth gaps on each of said rocking members, sets of teeth on said actuating member allotted to each of said rocking members, locking surfaces on said actuating member, said tooth gaps cooperating with said locking surfaces before and after the actuation of each of said rocking members by its respective sets of teeth.

4. In a driving gear for cash registers and the like, a drive shaft, an actuating member driven by said drive shaft, sets of teeth and locking surfaces on said actuating member, two rocking members, each of said rocking members being provided with tooth gaps, each of said rocking members being actuated by one of said sets of teeth, the said tooth gaps cooperating with said locking surfaces previous to and after the action of said rocking members by said teeth, interconnections between said rocking members for causing them to execute opposite rocking motions, a driven rocking shaft, one of said rocking members being fixed to said driven shaft.

5. A gear according to claim 4 in which one of said tooth gaps extends to half the thickness of its rocking member, a tooth of half width is left thereon and a tooth is formed by one of said locking surfaces being set to half the thickness of that part of the actuating member, upon which the respective locking surface is provided, said latter tooth cooperating with said former tooth to move the respective rocking member into cooperation with its respective set of actuating teeth.

6. A gear according to claim 4 in which said actuating member is provided with a mesh starting tooth cooperating with a special tooth on one of said rocking members, the locking surface with which the other of said rocking members cooperates after actuation by its set of actuating teeth being of such a length that it releases its cooperating tooth gap only when the said mesh starting tooth has come into mesh with said special tooth.

7. A gear according to claim 4 in which one of said tooth gaps of one of said rocking members comes out of cooperation with its respective locking surface of the actuating member when the other of said rocking members is actuated by its respective set of teeth, said former rocking member then being turned due to said actuation so that another of its tooth gaps arrives in operative relation to another of said locking surfaces, and said former rocking member is subsequently brought into engagement with its respective set of actuating teeth.

8. A gear according to claim 4 in which said actuating member is provided with a mesh starting tooth cooperating with a special tooth on one of said rocking members, a second starting tooth on said actuating member, cooperating with a special tooth on the other of said rocking members, one of said tooth gaps of the former rocking member coming out of cooperation with its respective locking surface of the actuating member when said other rocking member is actuated by its respective set of teeth, said former rocking member then being turned due to said actuation so that another of its tooth gaps arrives in operative relation to another of said locking surfaces, said first-named starting tooth engaging with its respective special tooth to start said former rocking member into cooperation with its set of actuating teeth, one of the tooth gaps of said other rocking member coming out of engagement with its respective locking surface of the actuating member when said former rocking member is actuated by its set of actuating teeth, said other rocking member then being turned due to said actuation so that another of its tooth gaps arrives in operative relation to another of said locking surfaces, said second starting tooth subsequently engaging its respective special tooth to start said other rocking member into cooperation with its set of actuating teeth.

The foregoing specification signed this 21st day of June, 1929.

ERNST BREITLING.